United States Patent

[11] 3,614,193

[72] Inventor Leo Beiser
 Flushing Manor, N.Y.
[21] Appl. No. 28,638
[22] Filed Apr. 15, 1970
[45] Patented Oct. 19, 1971
[73] Assignee Columbia Broadcasting Systems, Inc.

[54] LIGHT SCANNING SYSTEM UTILIZING DIFFRACTION OPTICS
9 Claims, 5 Drawing Figs.

[52] U.S. Cl. ................................................. 350/7, 178/7.6, 350/162 ZP
[51] Int. Cl. ................................................. G02b 17/00
[50] Field of Search ..................................... 350/162 ZP, 6, 7; 178/7.6

[56] References Cited
UNITED STATES PATENTS
1,962,474 6/1934 Baird ................... 350/162 ZP UX
3,019,292 1/1962 John .................... 350/7 X
3,087,987 4/1963 Stone, Jr. .............. 350/7 X Primary Examiner—David Schonberg
Assistant Examiner—John W. Leonard
Attorney—Spencer E. Olson ABSTRACT: For use in apparatus for transmitting and/or recording intelligence, optical scanning means including a spinner element in the form of a partial sphere having a plurality of diffracting zone-type lenses distributed therearound and adapted for continuous rotation about a concentric axis, and an optical system for directing onto said spherical surface light flux converging to a first focal point on the rotational axis of the spinner so that each impinging ray arrives substantially normal to the spherical surface. The individual zone-type lenses reconverge rays impinging thereon to new foci which scan an image surface lying along a circular locus as the spinner is rotated. The optical system which converges the incoming light onto the spinner element is preferably nonaxial with respect to the rotating system, and may comprise either a diffraction reflector or a geometrical reflector.

INVENTOR.
LEO BEISER

BY

ATTORNEY

INVENTOR.
LEO BEISER
BY
ATTORNEY

3,614,193

LIGHT SCANNING SYSTEM UTILIZING DIFFRACTION OPTICS

BACKGROUND OF THE INVENTION

This invention relates to scanning methods and apparatus and, more particularly, to an improved rotating reflector and system for illuminating the same for facilitating high-resolution, high-speed optical scanning of an image surface.

There is in common use today many forms of scanning mechanisms, capable, for example, of scanning a graphic original to convert the information contained therein into corresponding electrical pulses. These incorporate a variety of techniques, both electronic and mechanical, typical of the latter being those including a multifaceted mirror in the shape of a frustum of a cone or a pyramid as disclosed in U.S. Pat. No. 3,097,987; and various arrangements of rotating mirrors, one of which is disclosed in U.S. Pat. No. 3,370,504. A system employing a spinner of pyramidal shape and including means for illuminating the same to improve the optical efficiency of the system is described in application Ser. No. 738,234 for "Laser Scanning System Including Rotating Reflector" assigned to the same assignee as the present invention. Although each of these are well proven and enjoy success in their particular areas of utility, each has characteristics which limit its effectiveness in extremely high-resolution and high-speed scanning systems. For example, the cost of fabricating pyramidal-shaped multifaceted spinners to achieve substantial identity in the reflecting properties of all of the facets is extremely high; so high that the full potential of such high-speed systems is inhibited by prohibitive costs. Moreover, at the high speeds at which such spinners are required to be rotated, be they pyramidal or prismatic in shape, there is considerable surface "air drag" which increases the power required to drive it in rotation. Perhaps more serious, the inertial deformation of spinners of pyramidal or prismatic shapes that occurs at high speeds causes dynamic optical distortion of the facets which, in turn, degrades the resolution of the overall system.

SUMMARY OF THE INVENTION

An object of the present invention is to remedy the shortcomings of the known methods and apparatus referred to above. A more particular object of the invention is to provide a spinner for scanning apparatus which is easier and more economical to fabricate and which has lower inertia for the same resolution, lower dynamic optical distortion, and lower surface friction during high-speed rotation than known spinners of this general type, and to provide an improved optical system for illuminating the spinner.

The foregoing and other objects of the invention are attained in a representative embodiment thereof by a spinner element in the form of a partial sphere, having on its spherical surface a plurality of sectors of diffracting (zone) lenses, each adapted to reconverge a family of incident ray groups to new foci. A suitable optical system, which may include either a geometrical or diffraction reflector, converges incoming light flux, from a laser for example, to a first focal point at or near the center of the partial sphere such that each impinging ray arrives normal to the spherical surface so as to achieve efficient stigmatic point reconstruction at the new foci. The spinner is arranged to be rotated about an axis so that the new foci scan an arcuate image surface.

The diffracting (zone) lenses are photographically applied to the spherical surface of the spinner and thus do not disturb its otherwise regular smooth shape, thereby minimizing surface "air drag" and reducing the drive power required for high-speed rotation. The favorable distribution of the mass of the spinner of partial spherical shape results in less differential inertial deformation than that which occurs in a spinner of pyramidal shape, for example, and consequently reduced dynamic optical distortion. The ease of machining a spherical surface, as compared with a body having a plurality of planar surfaces, together with the ability to photographically apply a plurality of identical (zone) lenses thereto, exposed from a common source, not only reduces the cost of fabrication but also contributes to greater accuracy and reproducibility of the spinner.

DESCRIPTION OF THE DRAWINGS

Other objects, features and advantages of the invention will become apparent, and its construction and operation better understood, from the following detailed description, taken in conjunction with the accompanying drawings, in which.

DESCRIPTION OF THE PREFERRED EMBODIMENTS

Figure 1:
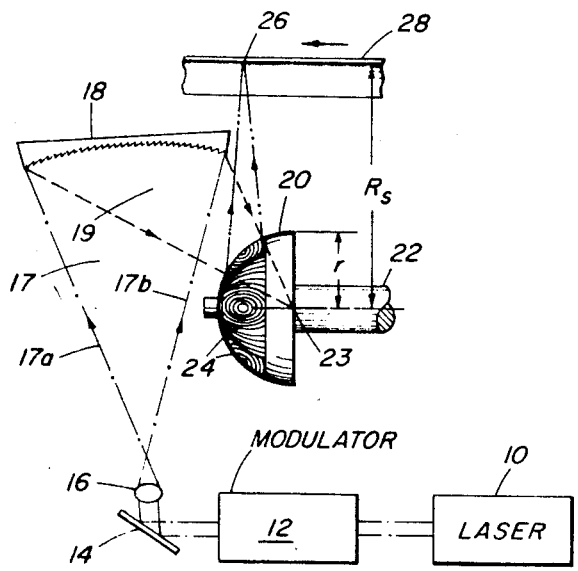
FIG. 1 is a schematic side view of a first representative embodiment of scanning apparatus constructed in accordance with the invention.

FIG. 1 illustrates, in schematic form, the essential elements of scanning apparatus useful, for example, in high-speed high-resolution systems for recording and/or reproducing intelligence on a record medium. The apparatus includes a source of light, preferably a laser 10 for producing a beam of monochromatic coherent light. When the apparatus is used for recording, the beam is directed through a suitable light modulator 12 which modulates the intensity of the beam in accordance with the information to be recorded. If the system is to be used to read out information previously recorded, the modulator 12 is, of course, omitted, and a light sensor (not shown) is arranged to collect radiation reflected from (or transmitted through) the record medium as the latter is scanned by the scanning apparatus.

Assuming for purposes of the description to follow that the apparatus is used in the recording mode, the intensity-modulated laser beam is reflected by a suitable mirror 14 onto a beam expander diagrammatically shown at 16, which directs a diverging beam 17 (of which two rays 17a and 17b are shown) onto a reflector 18. The reflector is constructed and arranged to reimage the injected diverging beam 17 into a beam 19 which converges toward a focal point at a location displaced from the injected beam, in this case, on the rotational axis of a spinner 20. In the embodiment of FIG. 1 the reflector 18 is of the diffraction type, having an optical grating on its surface designed to diffract the diverging flux incident thereon and converge it at point 23. The mirror 14 is employed for packaging convenience, and the mirror and beam expander is, of course, representative of only one of several ways for injecting a diverging beam onto reflector 18.

In accordance with an important aspect of the invention, the spinner 20 is in the form of a partial sphere, in FIG. 1 a hemisphere, secured to a shaft 22 on which it is rotated by a motor or other suitable motive means (not shown). The spinner is positioned with its spherical surface generally facing reflector 18 and is so orientated relative to the reflector that if the cone of light flux 19 were not intercepted by the spinner it would converge at a focal point 23 positioned on the axis of rotation of shaft 22 and substantially at the center of the spherical surface.

In order for the rotating spinner to impart a scanning motion to the light incident thereon, that portion of the area of the spherical surface illuminated by the converging beam 19 has a plurality of zone-type lenses 24 thereon, the number depending on the dimensions of the spinner, the distance from the spinner to the image surface to be scanned, and the rotational speed necessary to achieve the speed and resolution requirements of a given system. Each of the lenses occupies a sector of the spherical surface, and may be contiguous with the adjacent lenses on either side thereof, whereby the entire area of the spherical surface illuminated by converging light beam 19 is occupied by lenses.

A zone lens, long known in optics, generally comprises a plate formed with a large plurality of concentric circular areas or zones which are equal in area and alternately transparent and opaque so that light intercepted by the plate is, by a process of interference, brought to a definite focus. Thus, the zone-type lenses 24 intercept and reconverge a family of incident ray groups to new foci, the number depending upon the number of lenses illuminated by the beam 19. With the converging illuminating light flux focused at the center of the spherical surface, each impinging ray arrives substantially normal to the diffracting spherical surface, thereby satisfying a basic illuminating requirement for efficient stigmatic point reconstruction. The individual lenses 24 are identical and are designed to reconverge the converging light incident thereon to a scanning focal point 26 on a storage medium, such as a film strip 28. As the spinner 20 is driven in rotation, the scanning focal point 26 describes a circular locus centered about the axis of rotation of the spinner. The scanning focal point has a uniform scan velocity along a circular arc (providing the rotational speed of the spinner is uniform)—a simple geometric form to which the film may be readily formed by a suitable platen (not shown)—so that the scanning focal point is always in sharp focus on the image surface. This is very important because in systems of this kind the depth of focus is extremely small, comparable to the thickness of the emulsion on photographic film.

The zone-type lenses may be applied to the spherical surface of spinner 20 by generally known interferometric techniques and an exposure process of which the following is typical. The spherical surface of the spinner is coated with a photosensitive film, such as dichromated gelatin, and the spinner mounted for rotation in an optical exposure apparatus not unlike the system illustrated in FIG. 1 including a laser, a modulator, a mirror, a beam expander and a converging lens arranged to direct a first beam through a suitable mask (not shown) onto a sector of the spherical surface of the spinner. At the same time that a given sector is illuminated by the said first beam, the same sector is illuminated through the mask by a second light beam arriving along a path which includes the focal point 26. This said second beam should be coherent with the said first beam and may be derived from the same laser by utilizing suitable known beam splitting and/or appropriate folding mirrors. After exposure of controlled light intensity and duration upon a first sector of the spherical surface, the shaft 22 is accurately incrementally rotated (by means not shown) to a new position for exposure of a second sector in the same manner, and so on sequentially until the desired number of sectors are exposed to record the hologram of the array of object points 26. Applied in this manner the lenses do not materially increase the mass of the spinner, nor do they perceptively increase the surface "air drag" when the spinner is rotated at high speeds.

The spinner surface is then processed or developed to reveal the spatial record of the fringes resulting from the simultaneous exposure of the two said light beams; that is, to form on the spherical surface a plurality of contiguous zone-type lenses which are precise duplicates of each other. When the spinner is inserted in the apparatus of FIG. 1 and illuminated by a light wave the same or similar to the original first wave, the individual zone-type lenses reconstruct a set of focal points 26 in accordance with the extent the wave illuminates the surface of the spinner. That is, if the diameter of the converging beam 19 is sufficiently large to simultaneously illuminate more than one lens, and in a preferred embodiment this is the case, a like number of scanning focal points are reconstructed. Thus, by virtue of the contiguous lenses and the simultaneous illumination of more than one lens, successive scanning light beams, with zero retrace time between successive scans, are provided.

Figure 2:
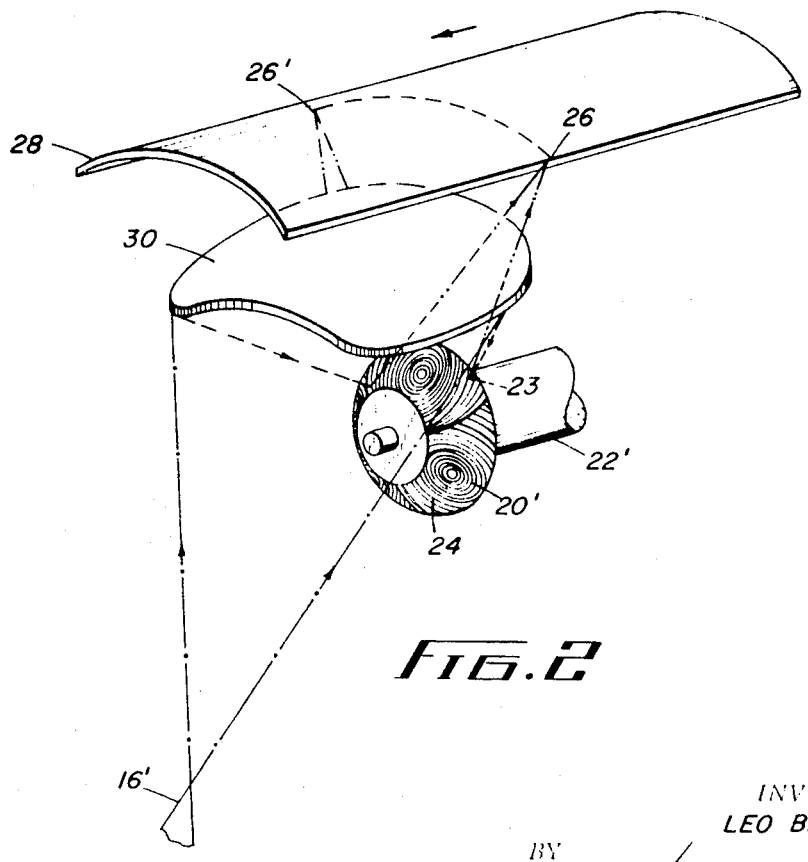
FIG. 2 is a pictorial view of scanning apparatus similar to that illustrated in FIG. 1 but employing an elliptical reflector instead of a diffraction reflector for converging light flux onto the spinner.

FIG. 2 illustrates a variation of the structure of FIG. 1, the change consisting mainly in that the spinner 20' is of somewhat lower mass by virtue of the removal of a portion of the hemisphere as shown, and the use of a geometrical reflector 30 instead of a diffraction-type reflector. It will be understood, however, that the spinner of FIG. 1 can also be used with the geometrical reflector of FIG. 2, and the spinner of FIG. 2 with the diffraction reflector of FIG. 1. The zone-type lenses 24 are applied in the same manner as described in connection with FIG. 1. This change in the shape of the rotor permits a slightly different positioning of the reflector relative to the spinner, and the position at which the light is reconverged to the scanning focal point 26'.

In this embodiment, the spinner is illuminated by a reflector 30 of elliptical shape through reflection of an incident diverging beam of light 17' from a source indicated at 16'. As in the system of FIG. 1, as the spinner is driven in rotation, the lenses 24 reconstruct a set of scanning foci 26' which describe a circular arc. The image surface, shown as a film 28, is drawn past the scanning region over a curved platen (not shown) displaced slightly in the radial direction from reflector 30. This arrangement results in compact packaging of the operational elements of the scanning system, and a small f-number, essential to high resolution.

FIG. 2 also shows more clearly than does FIG. 1 the nature of the scanning movement effected by the scanning focal point 26. An important feature of the invention is that the focal point at which the converging rays of light from the reflector would come to focus if not intercepted by the spinner is on the axis of the spinner. Positioning the focal point 23 on the rotational axis assures a uniform scan velocity of the scanning focal point 26 (provided the rotational velocity of the spinner is uniform) along a circular arc centered about the axis of rotation. The scanning is therefore free of distortion produced by nonuniform scan velocity and, a circular arc being a simple geometric form, the film 28 is readily curved so that the scanning focal point 26 is always in sharp focus on the image surface. As shown, the scanning focal point 26, which is diffraction limited in size by the characteristics of the individual lenses, is in sharp focus throughout its useful scanning cycle, between position 26 at one edge of the film and point 26' at the other edge.

The arrangement of the optical elements in the systems thus far described yield a scanning cone having an f-number of approximately f/4 with an $R_s/r$ ratio ($r$=spinner radius, $R_s$=scanning radius) of approximately four. As is pointed out in applicant's paper "Laser Beam Scanning for High Density Data Storage and Retrieval," SPSE News, Vol. 10, No. 5, Sept./Oct. 1967, in the interest of inertial economy in high-speed scanning systems of this type, it is desirable to maximize the ratio $R_s/r$, which is normally accomplished by minimizing the radius of the spinner.

Figures 3, 4:
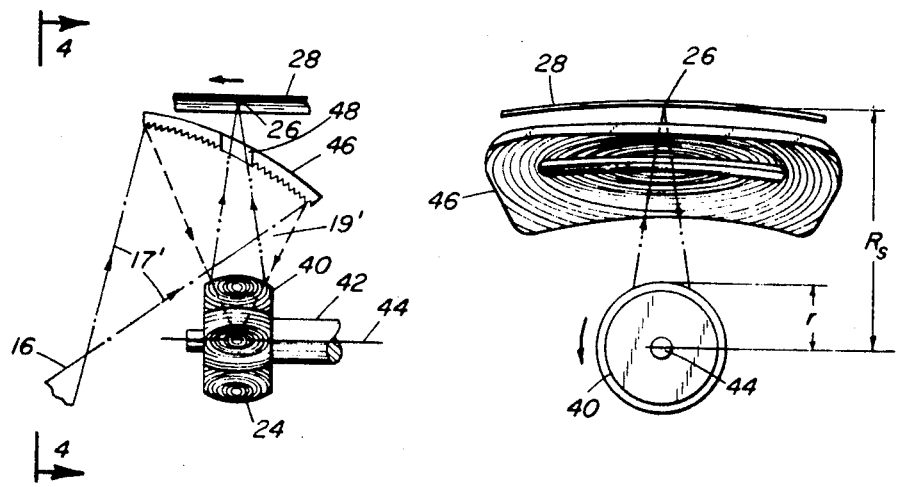
FIG. 3 is a schematic side view of still another arrangement of a spinner and associated optical system for illuminating the same.
FIG. 4 is a front view of the apparatus of FIG. 3 in the plane of line 4—4 of FIG. 3.

FIGS. 3 and 4 are side and front views, respectively, of still another embodiment of the invention in which the spherical peripheral surface of the spinner 40 is defined by a truncated section taken from the central portion of a sphere. Zone-type lenses 24 are applied to the spherical peripheral surface in the manner previously described, and the rotor is mounted on a shaft 42 for rotation about an axis 44. Inertially and geometrically, this spinner is similar to a cylindrical rotor and thus has even less optical deformation at high-rotational velocity by reason of reduced inertial stress and strain than the more conically shaped spinners of FIGS. 1 and 2.

In this system, the reflector 46 which converges the incoming diverging light beam 17' onto the spinner may be either of the diffraction or geometric type, and has a slit 48 therein oriented in the direction normal to the plane of the paper through which the beam 19' is reconverged to the scanning focal point 26 on the recording medium. So long as the slit width is small compared to the total width of the reflector 46, its presence in the illuminating system has only a minor effect on the resolution of the system. The slit allows the reflector to be positioned between the rotor and the image surface, thereby contributing to packaging economy, providing incidence of the converging rays 19' substantially normally to the spherical surface of the spinner, and achieving a scanning $f/3$ cone, as compared to an $f/4$ cone in the systems of FIGS. 1 and 2. The larger scanning aperture gives a higher resolution, and this is achieved while retaining a favorable $R_s/r$ ratio of approximately 4.

Figure 5:
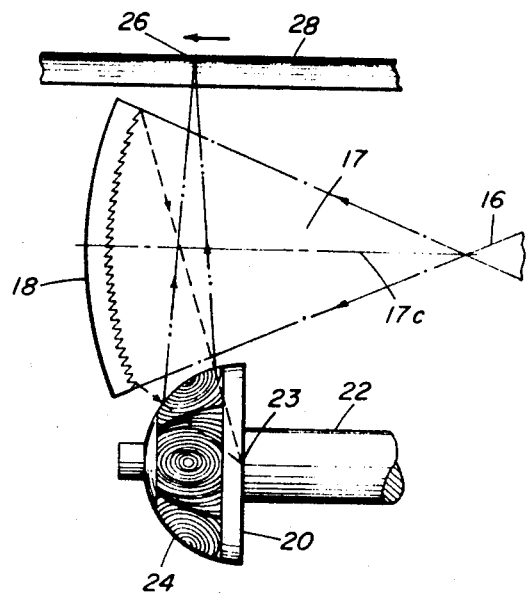
FIG. 5 is a side view of yet another scanning system embodying the invention.

FIG. 5 illustrates still another scanning system embodying a spinner element having zone-type lenses on its peripheral surface, in this case being semihemispherical in form as in the apparatus of FIG. 1. In this embodiment, however, a reflector 18 of the diffraction type is positioned in a plane substantially perpendicular to the rotational axis of the spinner, and displaced from the axis to be illuminated by a diverging beam of light 17 from a source 16, the principal ray 17c of which is generally parallel to the spinner axis. The diffractive surface of reflector 18 is constructed to converge the incident beam toward a focal point 23 on the axis of the spinner to thereby illuminate the portion of the spherical surface occupied by the lenses 24. As in the above-described embodiments, the cross-sectional area of the incident converging beam is sufficiently large to simultaneously illuminate more than one lens. The lenses 24 (which will have been laid down in an exposure apparatus having a similar arrangement of optical elements by the technique described earlier) redirect and converge the incident light to a scanning focal point 26 which, as in the other embodiments, describes a circular locus lying in a plane normal to the axis of rotation of the spinner. The presence of the scanning beam in the illuminating beam has no effect on the system.

It will be evident from the foregoing that the described scanning apparatus satisfies the objects of ease and economy of spinner fabrication, and reduction of dynamic optical distortions as compared to spinners having shapes of less favorable distribution of spinner mass. The spinner shape also has a lower inertia and angular momentum for a given resolution thereby reducing the requirements of the drive and speed control system. The spinner may be used in a variety of illuminating systems, the choice depending essentially on the packaging constraints of a given system application. In each case, however, more than one lens are simultaneously illuminated by a beam converging toward a focal point located on the axis of rotation of the spinner, whereby the lenses reconstruct a like number of scanning focal points each describing a circular locus.

I claim:

1. Scanning apparatus comprising, in combination, a source of coherent electromagnetic radiation for producing a diverging beam of radiation, reflector means positioned to be illuminated by and operative to converge radiation from said source towards a first focal point located on a predetermined axis, spinner means having a spherical surface concentric with said predetermined axis and rotatable about said predetermined axis, said spinner means having a plurality of zone-type lenses circumferentially distributed about said spherical surface, and being so positioned relative to said reflector means that said converging radiation illuminates a sector of said spherical surface containing more than one zone lens, said lenses being operative to redirect said converging radiation toward respective scanning focal points, and motive means for rotating said spinner means about said predetermined axis, said scanning focal points describing circular loci concentric with said predetermined axis.

2. Scanning apparatus according to claim 1 wherein said spinner means is hemispherical in shape.

3. Scanning apparatus according to claim 1 wherein said spinner means has the shape of a truncated hemisphere.

4. Scanning apparatus according to claim 1 wherein the spherical peripheral surface of said spinner means is defined by a truncated section taken from the central portion of a sphere.

5. Scanning apparatus according to claim 1 wherein said lenses are photographically applied to said spherical surface by interferometric means.

6. Scanning apparatus according to claim 1 wherein said reflector means is a geometric reflector.

7. Scanning apparatus according to claim 1 wherein said reflector means is a diffraction reflector.

8. Scanning apparatus according to claim 4 wherein said reflector means is a diffraction reflector radially displaced from said spinner means and positioned between said spinner means and the loci of said scanning focal points, said diffraction reflector having a slit therein for passing the beam of radiation converging to said scanning focal points.

9. Scanning apparatus according to claim 1 wherein said reflector means is a diffraction reflector positioned substantially perpendicularly to said predetermined axis, and the principal ray of the diverging beam of radiation from said source approaches said reflector substantially parallel to said predetermined axis.

UNITED STATES PATENT OFFICE
CERTIFICATE OF CORRECTION

Patent No. 3,614,193    Dated  October 19, 1971

Inventor(s) Leo Beiser

It is certified that error appears in the above-identified patent and that said Letters Patent are hereby corrected as shown below:

On the cover sheet in item [73] "Systems" should read -- System -- . In the ABSTRACT, line 13, "nonaxial" should read -- non-axial -- . Column 1, line 15, "multifaceted" should read -- multi-faceted -- ; line 17, "3,097,987" should read -- 3,087,987 -- ; line 28, "multifaceted" should read -- multi-faceted -- ; line 53, "partial sphere" should read -- partial-sphere -- . Column 2, line 49, "reimage" should read -- re-image -- . Column 5, line 9, "semihemispherical" should read -- semi-hemispherical -- .

Signed and sealed this 24th day of October 1972.

(SEAL)
Attest:

EDWARD M. FLETCHER, JR.
Attesting Officer

ROBERT GOTTSCHALK
Commissioner of Patents